(12) United States Patent
Magnin

(10) Patent No.: US 7,043,977 B2
(45) Date of Patent: May 16, 2006

(54) DEVICE AND METHOD FOR MEASURING PARAMETERS DURING FLIGHT TESTS OF AN AIRCRAFT

(75) Inventor: Herve Magnin, Flourens (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/930,776

(22) Filed: Sep. 1, 2004

(65) Prior Publication Data
US 2005/0066722 A1 Mar. 31, 2005

(30) Foreign Application Priority Data
Sep. 26, 2003 (FR) .................. 03 11339

(51) Int. Cl.
*G01W 1/00* (2006.01)
(52) U.S. Cl. .................. 73/170.16; 73/170.17; 340/601
(58) Field of Classification Search .......... 73/170.02, 73/700–756, 170.16, 170.17; 340/601
See application file for complete search history.

(56) References Cited

U.S. PATENT DOCUMENTS

| | | | |
|---|---|---|---|
| 2,440,198 A | | 4/1948 | Green |
| 2,602,329 A | | 7/1952 | Clark |
| 4,604,612 A | * | 8/1986 | Watkins et al. ............. 340/582 |
| 4,804,154 A | * | 2/1989 | Davis .......................... 244/1 R |
| 5,167,385 A | * | 12/1992 | Hafner ....................... 244/76 R |
| 5,375,471 A | * | 12/1994 | Blazic et al. ................. 73/767 |

FOREIGN PATENT DOCUMENTS

EP  0 813 049  12/1997

\* cited by examiner

*Primary Examiner*—Max Noori
*Assistant Examiner*—Jermaine Jenkins
(74) *Attorney, Agent, or Firm*—Oblon, Spivak, McClellland, Maier & Neustadt, P.C.

(57) ABSTRACT

A sensor support includes a rigid insert, on which a sensor is installed, and a flexible envelope fitted at a bottom face thereof with a double-sided adhesive to bond the sensor support to an aircraft structure Assembly and disassembly of the sensor are easy and the air flow is only slightly disturbed. This device is applicable to flight test campaigns of an aircraft or simulated flights to measure noise or pressure.

19 Claims, 2 Drawing Sheets

DEVICE AND METHOD FOR MEASURING PARAMETERS DURING FLIGHT TESTS OF AN AIRCRAFT

BACKGROUND OF THE INVENTION (1) Field of the Invention

This invention relates to a device for measuring parameters during flight tests of an aircraft, and a method making use of this device.

(2) Description of Related Art

Sensors, particularly pressure and noise sensors, must be placed on the outside surface of aircraft during tests to measure corresponding parameters during the flight. They may also be placed in holes formed in the aircraft, but obviously this method of working causes damage and will not be preferred; it is impossible if tanks or other equipment are located just behind the surface.

Sensors are then surface mounted on the aircraft through a support. In one known design, the support is a rigid aluminum disk, and the sensor is located on the top surface of this disk. The disk and the outside surface of the aircraft are bonded together using double-sided adhesives.

This design has several disadvantages. Firstly, it may be difficult to make the disk bond to the aircraft surface because the curvature of the aircraft is usually different from the curvature of the disk. This curvature also makes it necessary to close off the gap occurring between the periphery of the disk and the outside surface of the aircraft by a mastic seal, which is difficult to install so that it becomes necessary to wait for polymerization for several hours while protecting the seal and possibly correcting any defects. It is also difficult to disassemble the disk after the test, because the mastic has to be removed and then the bonding adhesive has to be cut, which is located not far from the center of the disk, by inserting a blade under the disk and then working blind, with the risk of damaging the aircraft surface. Finally, the tests themselves are often distorted by the fairly thick disk that forms relief on the surface of the aircraft, even if the periphery of the disk is beveled to prevent an excessively sudden surface discontinuity.

Another support design provides a means of reducing this latter disadvantage of distorting the measurements. One embodiment is described in French patent 2 749 656: the support then comprises a thin plate with a large surface area that is custom made to follow the curvature of the aircraft surface at the location at which it must be installed. The plate and the aircraft surface can also be bonded together using a double-sided adhesive, but this adhesive is sufficiently thick so that there is a gap between the plate and the aircraft surface, inside which the sensors are housed.

It is obvious that custom manufacturing of the plate is expensive and slow. The disadvantages are the same as for the mastic seal, since the mastic seal still needs to be used to fill in the gap between the periphery of the plate and the aircraft structure. Finally, the plate is always destroyed during disassembly and therefore can only be used once. It should also be added that this design is not suitable for noise sensors that have to be connected to the plate and therefore installed with it, with the risk of damaging them that is unacceptable due to their cost.

A new sensor support is proposed in this technical field as an improvement for the previous supports. The design of a small approximately disk-shaped support is reused, but differently. The new design enables easy assembly and disassembly of a support that is easily made and that has very little effect on the measurements, particularly even more than when a thin plate is used.

BRIEF SUMMARY OF THE INVENTION

In its more general form, the device is innovative in that the support is composed of a rigid insert on which the sensor is installed and a flexible envelope surrounding the insert and bonding to a portion of the outside surface of the aircraft. The flexible envelope is adjusted to the aircraft surface and only forms low relief. The double-sided adhesive bonds it to this surface with good adjustment around the perimeter that eliminates the need to add mastic to complete the assembly. The envelope is easily torn during disassembly, and it becomes easy to access the adhesive to remove it. There are only a few disadvantages in destroying the support because it is inexpensive. Finally, the shock absorbing properties usually associated with soft materials isolate the sensor from aircraft vibrations, provided that it is not in direct contact with the aircraft, which further improves the measurements.

BRIEF DESCRIPTION OF THE DRAWINGS

The invention will now be described with reference to the figures, in which.

DETAILED DESCRIPTION OF THE INVENTION

Figure 1:
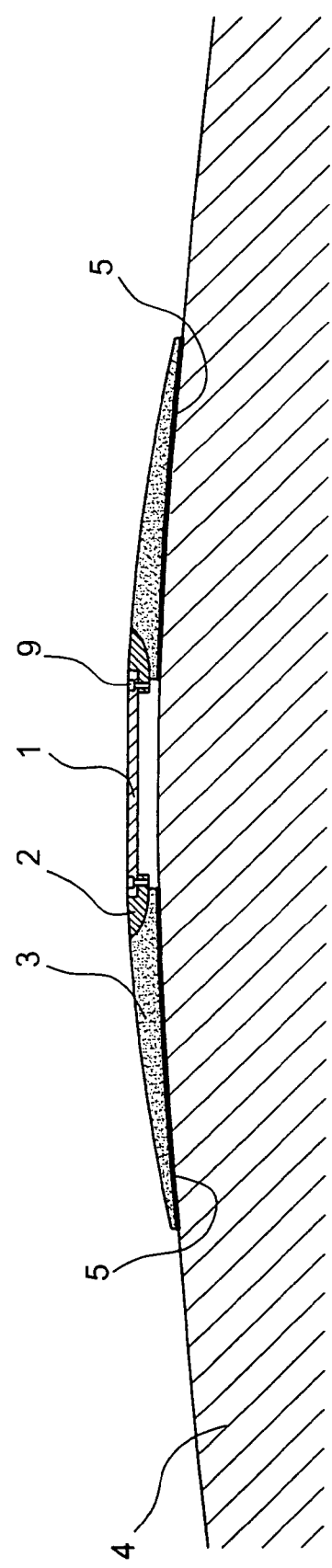
FIG. 1 is a sectional view of the device in its condition mounted on the aircraft and FIG. 2 is an exploded perspective view.
Figure 2:
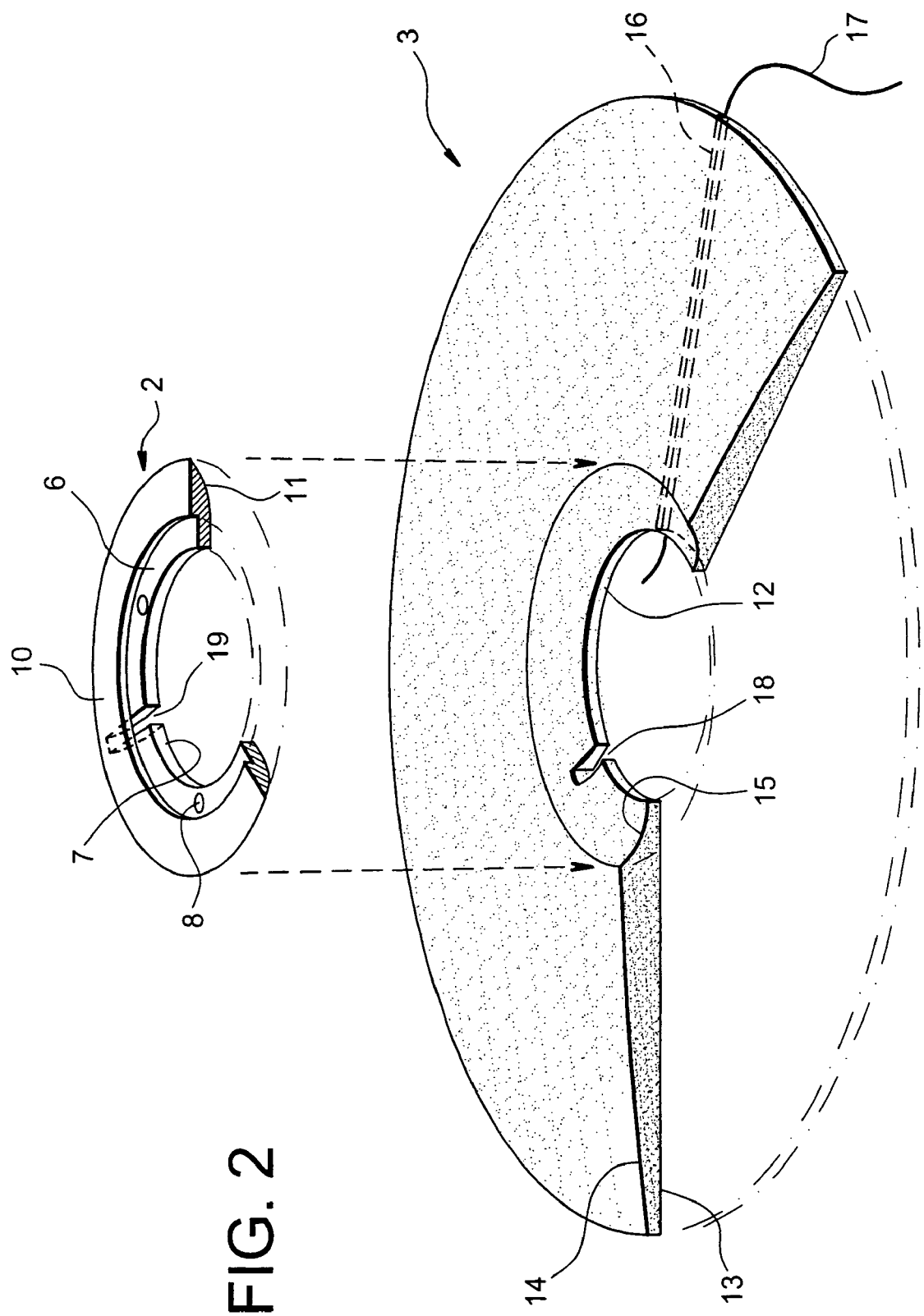

The measurement device comprises a sensor 1 that forms the active part of the device and may comprise a flat microphone in the case of noise measurements. Sensor 1 is housed on an insert 2 itself housed in an envelope 3 bonded to the outer surface of an aircraft structure 4 through double-sided adhesive 5 that lines the bottom face 13 of the envelope 3. The insert 2 is in the form of a crown in which the center has been removed, and includes a tier 6 around the center opening, forming the bottom of a housing 7 opening up into the outer surface of the insert 2 and in which the sensor 1 is arranged. The sensor 1 is held in place by tapped threads 8 formed under the tier 6 and into which corresponding screws 9 shown in FIG. 1 are inserted. The top surface 10 of the insert 2 is plane and its bottom surface 11, through which the insert 2 is bonded to the envelope 3, is curved and convex. The insert 2 is only used to house and retain the sensor by the means of assembly to the sensor and the central opening, and therefore its dimensions are only slightly greater than the sensor.

The envelope 3 is in the form of a disk that becomes thinner towards the periphery. It bonds to the structure 4 and therefore its area is larger than the area of the insert 2. The bottom face 13 is flat in the free state and the top face 14 is conical or more generally convex. However, an opening 12 is also formed at the center of the envelope 3, and the top face 14 forms a reception housing 15 for the insert 2. The bottom face 13 is notched with a radial groove 16 to allow the wires 17 leading to the sensor 1 to pass through. Notches 18 and 19 are produced along an extension of the openings of the envelope 3 and the insert 2 to provide access to parts of the sensor 1 to which the wires 17 lead.

The rigid insert 2 is advantageously made of a non-modifiable material such as stainless steel, and the flexible envelope 3 is made of a polymer such as fluorosilicone. Thus, the envelope 3 is perfectly adjustable to the curvature of the structure 4. The double-sided adhesive 5 placed under the entire area of the envelope 3 is entirely used to bond the envelope to the structure 4. There is no significant gap at the periphery of the envelope 3: plugging with mastic is no longer necessary. Another consequence of the flexibility of the envelope 3 and the small amount of the adjustment to the structure 4 is that the disturbance to the shape produced by the device on the structure 4 is much smaller than with prior designs and that the measures will thus be less distorted. For the same pattern, it is advantageous if the sensor 1 is flush with the top surface of the insert 2, and if it is flush with the top surface 10 of the envelope 3, so as to obtain a smooth and continuous top surface for the device. The bond between the insert 2 and the envelope 3 may be made by vulcanization or gluing that resists bending applied to it.

Since the envelope 3 is thicker at the center than the insert 2, it does not touch the structure 4 and does not transmit its vibrations to the sensor 1; they are damped in the envelope 3.

The materials proposed in this example have good resistance to the different temperatures that may be applied to them, under ordinary climatic conditions. The resistance to the change of pressure and hardness are good. The chemical resistance to water and liquids transported by the aircraft is also good. Expansion of the insert 2 may be absorbed by the envelope 3. The device may be used in real flight of the aircraft, or in simulated flight, for example in a wind tunnel.

The invention claimed is:

1. A measuring device to be installed on a portion of an aircraft outside surface, comprising a sensor and a support, wherein the support is composed of a rigid insert on which the sensor is installed and a flexible envelope surrounding the insert and bonding to the portion of the surface.

2. The measuring device according to claim 1, wherein the rigid insert is bonded to the flexible envelope and fitted with means of assembly of the sensor.

3. The measuring device according to claim 1, wherein the insert is made of stainless steel and the envelope is made of fluorosilicone.

4. The measuring device according to claim 1, wherein a bottom face of the envelope in a free state is flat and a top face is convex and the envelope is fitted with a central reception housing for the insert.

5. The measuring device according to claim 4, wherein a surface area of the envelope is larger than a surface area of the insert in a central portion.

6. The measuring device according to claim 1, wherein the insert is fitted with a housing for the sensor at an external face, the sensor is flush with the external face of the insert and the insert is flush with one face of the envelope.

7. The measuring device according to claim 1, wherein the envelope is fitted with a groove to allow passage of the wires connecting the sensor to a bottom face of the envelope.

8. The measuring device according to claim 1, wherein a bond between the insert and the envelope is made by gluing or vulcanization.

9. A method for measuring parameters of an aircraft in a real flight or in a simulated flight, the method comprising using the measuring device according to claim 1.

10. A method for measuring parameters of an aircraft in a real flight or in a simulated flight, the method comprising using the measuring device according to claim 9.

11. The method according to claim 10, wherein the parameters comprise sound or pressure.

12. The method according to claim 9, wherein the parameters comprise sound or pressure.

13. A measuring device, comprising:
a flexible envelope disk having a flat bottom face in a free state, a substantially conical top face, and an opening, the flexible envelope disk being configured to be bonded to a portion of an aircraft outside surface;
a rigid insert having an insert opening that includes a tier forming a housing, a top surface, and a convex bottom surface, the convex bottom surface being disposed on a corresponding curved surface of the opening of the envelope disk, the housing opening up into the top surface; and
a sensor disposed in the housing in the rigid insert.

14. The measuring device according to claim 13, wherein the rigid insert is bonded to the flexible envelope disk and comprises tapped threads configured to receive screws to hold the sensor to the rigid insert.

15. The measuring device according to claim 13, wherein the rigid insert is made of stainless steel and the flexible envelope disk is made of fluorosilicone.

16. The measuring device according to claim 13, wherein a surface area of the flexible envelope disk is larger than a surface area of the rigid insert.

17. The measuring device according claim 13, wherein an external face of the sensor is mounted flush with the top surface of the rigid insert and the top surface of the rigid insert is mounted flush with the conical top face of the flexible envelope disk.

18. The measuring device according claim 13, wherein the flexible envelope disk is fitted with a groove to allow passage of wires connected to the sensor.

19. The measuring device according to claim 13, wherein a bond between the rigid insert and the flexible envelope disk is made by gluing or vulcanization.

* * * * *